(12) United States Patent
Horng et al.

(10) Patent No.: US 6,517,896 B1
(45) Date of Patent: Feb. 11, 2003

(54) SPIN FILTER BOTTOM SPIN VALVE HEAD WITH CONTINUOUS SPACER EXCHANGE BIAS

(75) Inventors: Cheng T. Horng, San Jose, CA (US); Mao-Min Chen, San Jose, CA (US); Min Li, Fremont, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 81 days.

(21) Appl. No.: 09/633,768

(22) Filed: Aug. 7, 2000

(51) Int. Cl.[7] .............................. B05D 5/12; B05D 1/36; B05D 3/02; B05D 5/06
(52) U.S. Cl. ................. 427/123; 427/126.3; 427/126.4; 427/404; 427/419.1; 427/419.2; 427/376.1; 427/128
(58) Field of Search ............................. 427/123, 126.3, 427/126.4, 58, 404, 419.1, 419.2, 376.1, 128, 130, 131, 132

(56) References Cited

U.S. PATENT DOCUMENTS

| | | | |
|---|---|---|---|
| 5,637,235 A | | 6/1997 | Kim et al. ..................... 216/22 |
| 5,648,885 A | * | 7/1997 | Nishioka et al. ............ 324/252 |
| 5,896,252 A | | 4/1999 | Kanai .......................... 360/113 |
| 6,208,491 B1 | * | 3/2001 | Pinarbasi .................... 360/317 |
| 6,222,707 B1 | * | 4/2001 | Huai et al. ................ 360/324.1 |

* cited by examiner

Primary Examiner—Michael Barr
(74) Attorney, Agent, or Firm—George O. Saile; Stephen B. Ackerman

(57) ABSTRACT

A high performance specular free layer bottom spin valve is disclosed. This structure made up the following layers: NiCr/MnPt/CoFe/Ru/CoFe/Cu/free layer/Cu/Ta or TaO/ $Al_2O_3$. A key feature is that the free layer is made of a very thin CoFe/NiFe composite layer. Experimental data confirming the effectiveness of this structure is provided, together with a method for manufacturing it and, additionally, its longitudinal bias leads.

8 Claims, 3 Drawing Sheets

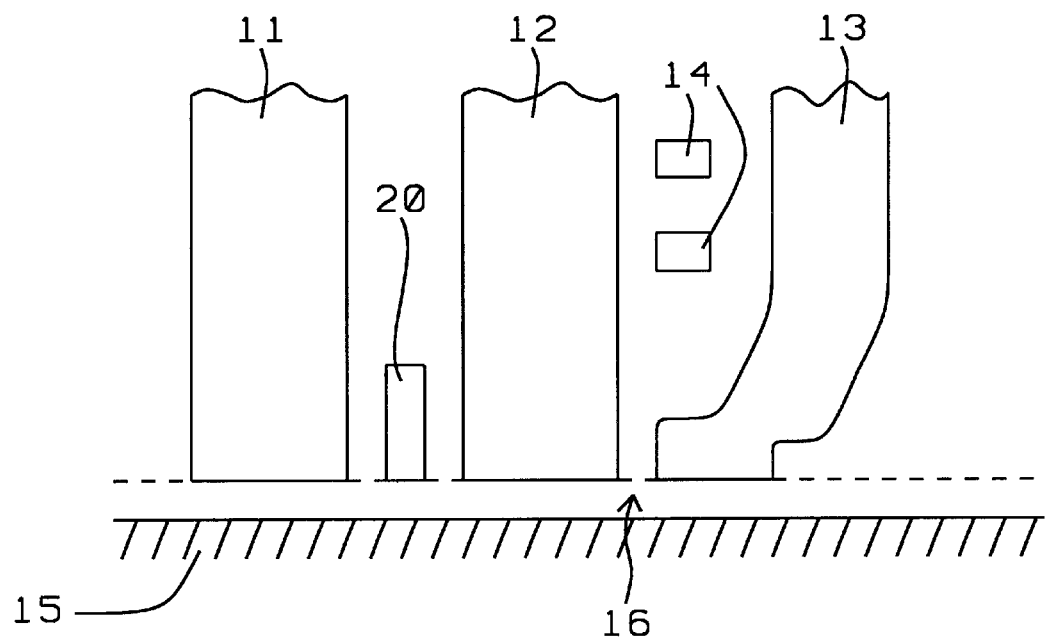
FIG. 1 — Prior Art
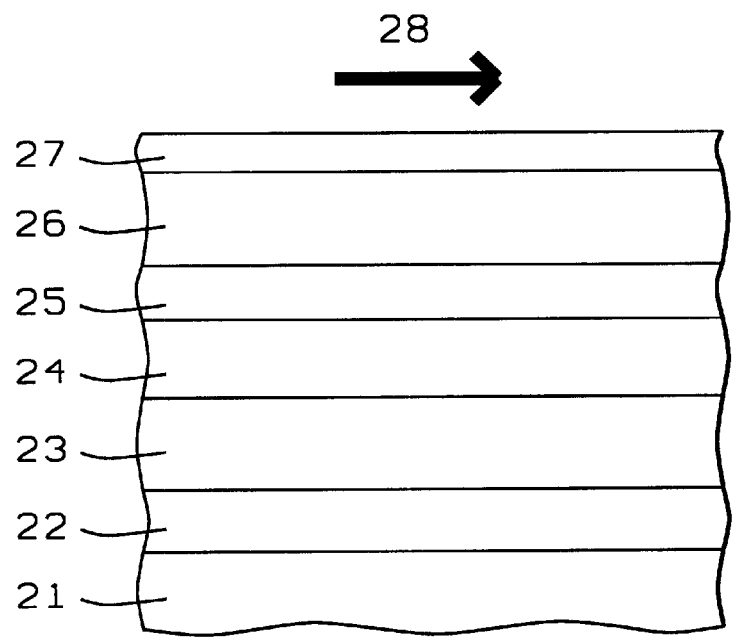
FIG. 2 — Prior Art

SPIN FILTER BOTTOM SPIN VALVE HEAD WITH CONTINUOUS SPACER EXCHANGE BIAS

FIELD OF THE INVENTION

The invention relates to the general field of GMR recording heads for magnetic disk systems with particular reference to design of the free layer.

BACKGROUND OF THE INVENTION

Read-write heads for magnetic disk systems have undergone substantial development during the last few years. In particular, older systems in which a single device was used for both reading and writing, have given way to configurations in which the two functions are performed by different structures. An example of such a read-write head is schematically illustrated in FIG. 1. The magnetic field that 'writes' a bit at the surface of recording medium 15 is generated by a flat coil, two of whose windings 14 can be seen in the figure. The magnetic flux generated by the flat coil is concentrated within pole pieces 12 and 13 which, while being connected at a point beyond the top edge of the figure, are separated by small gap 16. Thus, most of the magnetic flux generated by the flat coil passes across this gap with fringing fields extending out for a short distance where the field is still powerful enough to magnetize a small portion of recoding medium 15.

The present invention is directed towards the design of read element 20 which can be seen to be a thin slice of material located between magnetic shields 11 and 12 (12 doing double duty as a pole piece, as just discussed). The principle governing the operation of read sensor 20 is the change of resistivity of certain materials in the presence of a magnetic field (magneto-resistance). Most magnetic materials exhibit anisotropic behavior in that they have a preferred direction along which they are most easily magnetized (known as the easy axis). The magneto-resistance effect manifests itself as a decrease in resistivity when the material is magnetized in a direction perpendicular to the easy axis, said decrease being reduced to zero when magnetization is along the easy axis. Thus, any magnetic field that changes the direction of magnetization in a magneto-resistive material can be detected as a change in resistance.

It is widely known that the magneto-resistance effect can be significantly increased by means of a structure known as a spin valve. The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are shown in FIG. 2. In addition to a seed layer 22 on a substrate 21 and a topmost cap layer 27, these key elements are two magnetic layers 24 and 26, separated by a non-magnetic layer 25. The thickness of layer 25 is chosen so that layers 24 and 26 are sufficiently far apart for exchange effects to be negligible (i.e. the layers do not influence each others magnetic behavior at the atomic level) but are close enough to be within the mean free path of conduction electrons in the material. If, now, layers 24 and 26 are magnetized in opposite directions and a current is passed though them along the direction of magnetization (such as direction 28 in the figure), half the electrons in each layer will be subject to increased scattering while half will be unaffected (to a first approximation). Furthermore, only the unaffected electrons will have mean free paths long enough for them to have a high probability of crossing over from 24 to 26 (or vice versa). However, once these electrons 'switch sides', they are immediately subject to increased scattering, thereby becoming unlikely to return to their original side, the overall result being a significant increase in the resistance of the entire structure.

In order to make use of the GMR effect, the direction of magnetization of one of the layers 24 and 26 is permanently fixed, or pinned. In FIG. 2 it is layer 24 that is pinned. Pinning is achieved by first magnetizing the layer (by depositing and/or annealing it in the presence of a magnetic field) and then permanently maintaining the magnetization with an undercoat of a layer of antiferromagnetic material, or AFM, (layer 23 in the figure). Layer 26, by contrast,, is a "free layer" whose direction of magnetization can be readily changed by an external field (such as that associated with a bit at the surface 15 of a magnetic disk).

The structure shown in FIG. 2 is referred to as a bottom spin valve because the pinned layer is at the bottom. It is also possible to form a 'top spin valve' structure where the pinned layer is deposited after the pinning layer.

Ultra-thin free layers as well as MR ratio are very effective to obtain high output spin valve GMR heads for over 30 Gb/in$^2$ magnetic recording. In general, magneto-resistive devices have a characteristic response curve such that their sensitivity initially increases with the applied field, then is constant with applied field, and then decreases to zero for even higher fields. It is therefore standard to provide a biasing field to keep the sensor operating in the linear range where it is also at its most sensitive. However, as the free layer thickness decreases, it becomes difficult to obtain a controllable bias point, high GMR ratio and good magnetic softness all at the same time. Synthetic antiferromagnets (SyAF) are known to reduce magneto-static fields in a pinned layer, but a large bias point shift due to sense current fields remains a problem for practical use of an ultra-thin free layer. To overcome this problem, the spin-filter spin valve (SFSV) was invented.

In a SFSV, the free layer is placed between the Cu spacer and an additional high-conductance-layer (HCL). SFSV reduces sense current fields in the free layer by shifting the sense current center toward the free layer, resulting in a smaller bias point shift by sense current fields. High GMR ratio is maintained even in the ultra-thin free layer because the HCL improves the mean free path of a spin-up electron while maintaining the mean free path difference between spin-up and spin-down electrons.

As discussed earlier, spin valve GMR heads may be either top or bottom types. The GMR sensor track is defined by a patterned longitudinal biasing layer in the form of two bias stripes. These are permanently magnetized in a direction parallel to the surface. Their purpose is to prevent the formation of multiple magnetic domains in the free layer. The most commonly used longitudinal bias for the bottom spin valve is with contiguous (abutted) junction hard bias. The problem with the abutted junction is the existence of a "dead zone" at the sensor ends. A MR sensor track defined by continuous spacer exchange bias (similar to that for the DSMR) does not have the "dead zone". This may be critical for a very narrow track for ultra-high density recording application.

A routine search of the prior art was performed. The following references of interest were found. U.S. Pat. No. 5,637,235(Kim et al.) shows a SV with a capping layer. U.S. Pat. No. 5,896,252 (Kanai) shows a SV with a free magnetic layer composed of a CoFe and NiFe sublayers. while U.S. Pat. No. 5,648,885 (Nishioka et al.) teaches a SV with CoFe free layer.

SUMMARY OF THE INVENTION

It has been an object of the present invention to provide a spin-filter synthetic antiferromagnetic bottom spin valve that is suitable for ultra-high density magnetic recording applications.

Another object of the invention has been to provide suitable longitudinal biasing leads for this structure.

A further object of the invention has been to provide processes for the manufacture of these structures.

These objects have been achieved in a structure made up the following layers:

NiCr/MnPt/CoFe/Ru/CoFe/Cu/(free layer)/Cu/Ta or TaO. A key feature is that the free layer is made of thin CoFe plus a CoFe/NiFe composite layer in which CoFe is thinner than NiFe. Experimental data confirming the effectiveness of this structure is provided, together with a method for manufacturing it and the longitudinal bias leads.

BRIEF DESCRIPTION OF THE DRAWINGS

FIG. 1 is a schematic representation of a read-write head for a magnetic disk system.

FIG. 2 shows the cross-sectional structure of a spin valve according to the teachings of the prior art.

FIG. 6 shows a plan view of the structure of which FIG. 5 is a cross-section.

DESCRIPTION OF THE PREFERRED EMBODIMENTS

Relative to NiFe, sputter-etching of tantalum or tantalum oxide (TaO) is 3 times slower. In the present invention, the Ta or TaO capping layer of the bottom spin valve can be removed by using a carbon tetrafluoride reactive ion etching (RIE) process. The process for sputter etching the underlying Cu and partially etching of NiFe is controllable. These factors cause our process for forming an ultra-thin free layer bottom spin valve to be suitable for manufacturing.

Advantages of the processes and structures that we will disclose below include the following:

Bottom spin valves made by this invention have larger output signal amplitude.

The process for sputter-etching of the underlying Cu and (partially) etching NiFe for the continuous spacer exchange bias is controllable.

With the above design considerations in mind, we have worked out a structure and fabrication process to form a SF-SyAF bottom spin valve head with a very thin free layer. The GMR sensor track is defined by using a continuous exchange spacer bias.

Using the CVC GMR sputtering system, bottom SF-SyAF spin valves having: NiCr/MnPt/CoFe(1)/Ru/CoFe(2)/Cu/CoFe+NiFe(free layer)/Cu/Ta or TaO/configuration were made. Free layers of the present work are made of a very thin CoFe/NiFe composite layer. TaO in the present structure is formed by first depositing a thin (e.g. 10–15 Å) Ta film on the NiFe free layer, and then oxidizing it by oxygen plasma ashing.

We now describe the process of the present invention for both spin valves and read heads. In the course of this description, the structure of the present invention will also become clear.

Figure 3:
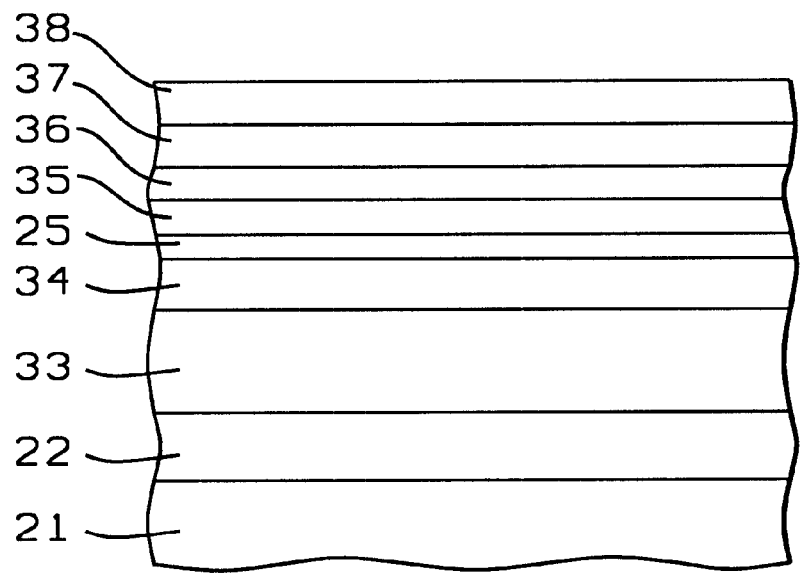
FIG. 3 shows the cross-sectional structure of a spin-filter spin valve according to the teachings of the present invention.

Referring now to FIG. 3, the process for manufacturing a spin valve begins with the provision of substrate 21 onto which there is deposited magneto-resistance-enhancing seed layer 22. Pinning layer 33 is then deposited onto layer 22. This pinning layer is between about 100 and 200 Angstroms thick. Our preferred material has been MnPt but similar materials such as IrMn, MnNi, ot MnPtPd could also have been used. This is followed by pinned layer 34, a synthetic antiferromagnetic material that is actually a laminate details not shown), deposited as follows:

first a layer of cobalt-iron, between about 12 and 25 Angstroms thick, then a layer of ruthenium, between about 6 and 9 Angstroms thick, and last a second layer of cobalt-iron, between about 12 and 25 Angstroms thick. It is a requirement that these two cobalt-iron layers differ in thickness by between about 2 and 10 Angstroms.

Next, non-magnetic copper spacer layer 25, between about 18 and 25 Angstroms thick, is deposited onto layer 34.

In a key feature of the invention, free layer 35 is then deposited. This free layer is actually a composite of a cobalt-iron layer, having a thickness between about 3 and 15 Angstroms and a nickel-iron layer that is between about 10 and 35 Angstroms thick, the CoFe being deposited first.

Next, high conductance copper layer 36, between about 5 and 15 Angstroms thick, is deposited on free layer 35. This is followed by the deposition of a specular reflection layer of either tantalum that may be left unchanged at a thickness between about 10 and 20 Angstroms or that is converted to tantalum oxide layer 37 through plasma oxidation, as discussed earlier. This tantalum oxide layer has a thickness between about 15 and 30 Angstroms. Then, capping layer of aluminum oxide 38, between about 100 and 300 Angstroms thick, is deposited on layer 37.

The process is then completed by annealing. This takes the form of heating in the presence a magnetic field of between about 5,000 and 10,000 Oe, in a transverse direction, at a temperature between about 250 and 280° C. for between about 5 and 10 hours.

The process for manufacturing a read head begins with the provision of a bottom spin valve structure that includes an ultra-thin specular free layer as described immediately above. First, capping layer 38 is removed by wet etching, thereby uncovering tantalum or tantalum oxide layer 37 onto which a layer of photoresist (comprising soluble underlayer 40a and insoluble top layer 40b), suitable for later lift-off, is applied and then patterned to define the shape of a pair of conductor leads. This can be seen in FIG. 4.

Then, all tantalum or tantalum oxide that is not protected by photoresist is removed by reactive etching in carbon tetrafluoride. This results in the uncovering of high conductance copper layer 15, which layer serves as an effective etch stop layer. Etching, by sputter-etching, then continues until all uncovered high conductance copper 36 has been removed, as well as a certain amount of nickel iron from free layer 35. The removed nickel iron is then refilled with a layer of ferromagnetic material such as NiFe or CoFe, to a slightly greater thickness than the removed material (because of some uncertainty in the thickness control). This is followed by deposition of a layer of antiferromagnetic material.

Figure 4:
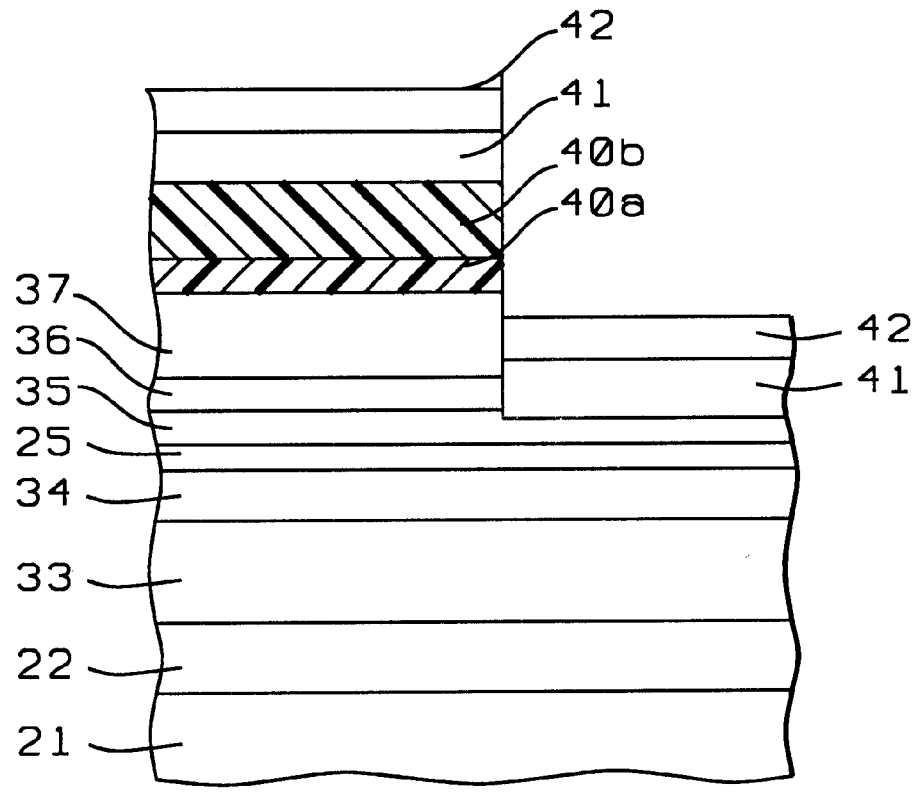
FIG. 4 illustrates how the structure of FIG. 3 is modified in order to apply longitudinal bias leads to it.

Continuing our reference to FIG. 4, biasing layer 41 is then deposited on layer 35 (i.e. the refilled nickel-iron) to a thickness between about 100 and 150 Angstroms. The biasing layer may be either an exchange bias layer made of manganese-platinum or a similar material such as IrMn, MnNi, or MnPtPd. This is followed by deposition of a layer of conductive material 42. Our preferred material for the layer of conductive material has been Ta/Au/Ta, but similar materials, such as Cr/Rh/Cr could also have been used. It is deposited to a thickness between about 300 and 400 Angstroms.

Figure 5:
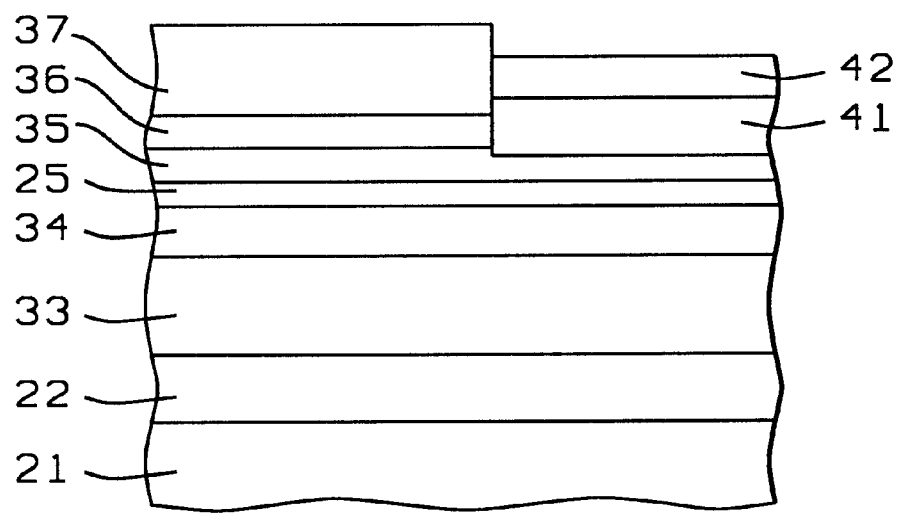
FIG. 5 shows the structure of FIG. 3 after longitudinal bias leads have been added to it.
Figure 6:
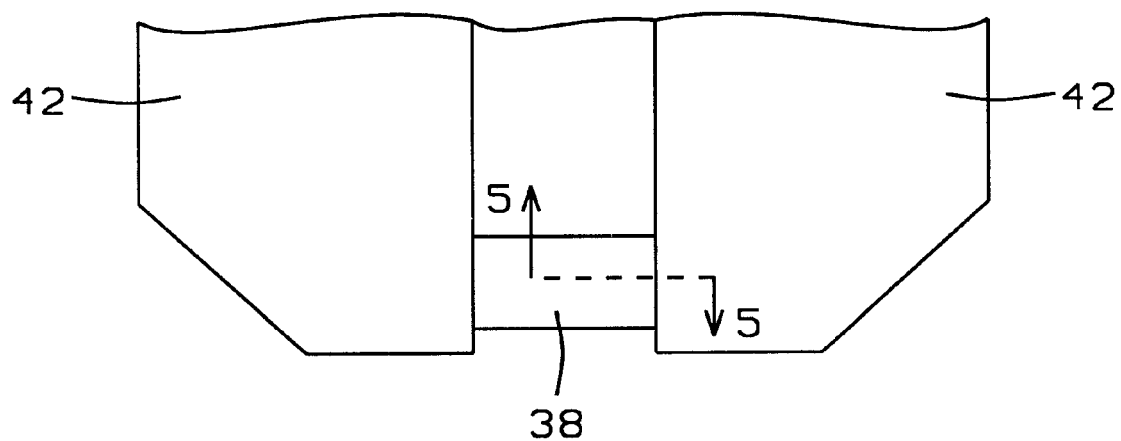

At this point the liftoff process is invoked so that all photoresist, together with all material on the resist's surface, is removed, giving the structure the appearance shown in FIG. 5. A plan view, of which FIG. 5 is a cross-section, is shown in FIG. 6.

The process is completed by annealing. This involves heating in the presence a magnetic field of between about 100 and 200 Oe in the longitudinal direction, at a temperature between about 250 and 280° C. for between about 2 and 5 hours.

Experimental Verification of the Invention

For comparison purposes, SF-SyAF top spin valves having:NiCr/Cu/NiFe+CoFe (free layer)/Cu/CoFe1/Ru/CoFe2/MnPt/NiCr configurations with equivalent layer thicknesses were also made.

To characterize free layer anisotropy, free layer structures made of 55 NiCr/20 Cu/2 CoFe-34 NiFe/15 Cu/TaO/$Al_2O_3$ and 55 NiCr/15 Cu/34 NiFe-2 CoFe/20 Cu/NiCr, respectively (where all numbers are thicknesses in Angstroms), for the bottom and top SFSV were also studied.

After forming free layer and GMR stacks, the deposited structures were first given a standard 6000 Oe transverse field 280° C.-5 hrs annealing. The high field annealing set up the pinned layer direction. After removing $Al_2O_3$ capping by wet etching, the GMR and the free layer stacks, were further given a low field (100 Oe) 250° C.-5 hrs annealing to reset the free layer in the sensor direction. This low field annealing was used to simulate the exchange bias annealing process.

Comparisons of the top and bottom spin valve free layer magnetic properties are illustrated in Table I, for similar structures.

For ultra-high density recording, the free layer of the bottom spin valve is made of a very thin CoFe/NiFe composite layer having a magnetic moment equivalent to that of a 37 Å thick NiFe layer. See Cell 3 and Cell 4/Cell 5, respectively, for the top and the bottom spin valves with ultra-thin free layer. Figure-of-merit (FOM) for the (2 Å CoFe/34 Å NiFe) spin valves is about 2× greater than that with (5 Å CoFe/55 Å NiFe) free layer. The difference. between Cell 4 and Cell 5, is that the composite free layer in cell 5 has a thicker CoFe component. The FOM for the (10 Å CoFe/20 Å NiFe) spin valve with 10 Å Cu HCL is about 2.5× greater than that of the (5 Å CoFe/55 Å NiFe) spin valve with 15 Å Cu HCL. Besides having greater FOM, the bottom spin valve has shown softer magnetic properties than the top spin valve. These results indicate that a bottom spin valve head gives higher sensor sensitivity to yield even higher output signal.

While the invention has been particularly shown and described with reference to the preferred embodiments thereof, it will be understood by those skilled in the art that various changes in form and details may be made without departing from the spirit and scope of the invention.

What is claimed is:

1. A process for manufacturing a specular free layer bottom spin valve, comprising the sequential steps of:

providing a substrate and depositing thereon a magneto-resistance-enhancing seed layer;

on said magneto-resistance-enhancing seed layer, depositing a pinning layer;

TABLE I

| Free layer structure: 80.9% NiFe | | $B_s$ | $H_c$ | $H_k$ | $R_s$ | Dr/r | Oe to close HA |
|---|---|---|---|---|---|---|---|
| CZB55/Cu15/NiFe32/CoFe3/Cu20/CZB50 | Top | 0.28 | 10.23 | 15.84 | 24.12 | 0.54 | 9 Oe |
| CZB55/Cu20/CoFe3/NiFe32/Cu15/TaO | Bottom | 0.28 | 6.77 | 14.67 | 25.85 | 0.65 | 4 Oe | where $B_s$ = magnetic moment, $H_c$ = free layer coercivity (oe), $H_k$ = anisotropy field (oe), and $R_s$ = sheet resistance (ohm/sq.)

As illustrated in TABLE I, the free layer of the bottom spin valve shows softer magnetic properties (i.e. lower $H_c$ and $H_k$) than that of the top spin valve. To close the hard axis (HA) loops for the free layers, applied longitudinal fields of 9 and 4 Oe are needed for the top and the bottom spin valve respectively.

Magnetic performance properties of the top and bottom SF-SyAF spin valves are listed in for similar structures TABLE II. For the top spin valve with (55 NiFe/5 CoFe) free layer, GMR ratio (Dr/r)=9.54% and output amplitude (Dr)= 1.20 ohm/sq. Dr/r and Dr for the bottom spin valve are 10% higher. Also $H_c$ and $H_k$ are lower.

on the synthetic antiferromagnetic pinned layer, depositing a non-magnetic copper spacer layer;

on the spacer layer depositing a free layer that further comprises a cobalt-iron layer that is less than 10 Angstroms thick and a nickel-iron layer that is between 10 and 30 Angstroms thick;

on the free layer, depositing a high conductance copper layer;

on the copper layer, depositing a specular reflection layer;

on said pinning layer, depositing a synthetic antiferromagnetic pinned layer;

TABLE II

| Structure: (80.9% NiFe/MP43%-2mt) | | $B_s$ | $H_c$ | $H_e$ | $H_k$ | $R_s$ | Dr/r | Dr | FOM |
|---|---|---|---|---|---|---|---|---|---|
| CZB55/Cu15/NiFe55/CoFe5/Cu20/CoFe23/Ru 7.5/CoFe18/MP150/CZB30/$Al_2O_3$ | 1 | 0.52 | 8.47 | 16.2 | 9.94 | 12.6 | 9.54 | 1.20 | 0.65 |
| CZB55/MP150/CoFe18/Ru7.5/CoFe23/Cu20/ CoFe5/NiFe55/Cu15/Ta10/OL/$Al_2O_3$ | 2 | 0.51 | 5.34 | 13.5 | 6.77 | 12.7 | 10.5 | 1.33 | 0.73 |
| CZB55/Cu15/NiFe34/CoFe2/Cu19/CoFe23/Ru 7.5/CoFe18/MP150/CZB30/$Al_2O_3$ | 3 | 0.28 | 7.20 | 13.5 | 7.44 | 14.6 | 9.74 | 1.42 | 1.33 |
| CZB55/MP150/CoFe18/Ru7.5/CoFe23/Cu20/ CoFe2/NiFe34/Cu15/Ta10/OL/$Al_2O_3$ | 4 | 0.29 | 6.05 | 4.56 | 2.20 | 15.5 | 10.7 | 1.66 | 1.45 |
| CZB55/MP150/CoFe18/Ru7.5/CoFe23/Cu20/ CoFe10/NiFe20/Cu10/Ta10/$Al_2O_3$ | 5 | 0.27 | 5.92 | 8.53 | 4.07 | 15.9 | 12.8 | 2.03 | 1.89 | where $B_s$ = magnetic moment, $H_c$ = free layer coercivity (oe), $H_e$ = inter-layer coupling field (oe), $H_k$ = anisotropy field (oe), $R_s$ = sheet resistance (ohm/sq.), MP = MnPt, and OL = oxidized layer on the specular reflection layer, depositing a capping layer of aluminum oxide; and then annealing.

2. The process described in claim 1 wherein said specular reflection layer is tantalum or tantalum oxide.

3. The process described in claim 1 wherein said pinning layer is between about 70 and 200 Angstroms thick and is selected from the group consisting of MnPt, IrMn, MnNi, and MnPtPd.

4. The process described in claim 1 wherein the step of depositing the synthetic antiferromagnetic pinned layer further comprises:

depositing a first layer of cobalt-iron, between about 12 and 25 Angstroms thick;

depositing a layer of ruthenium, between about 6 and 9 Angstroms thick; and then depositing a second layer of cobalt-iron, between about 12 and 25 Angstroms thick, said first and second cobalt-iron layers differing in thickness by between about 2 and 10 Angstroms.

5. The process described in claim 1 wherein the non-magnetic copper spacer layer is deposited to a thickness between about 18 and 25 Angstroms and the high conductance copper layer is deposited to a thickness between about 5 and 15 Angstroms.

6. The process described in claim 2 wherein the step of depositing the tantalum oxide layer further comprises depositing a layer of tantalum and then ashing it in an oxygen plasma, thereby forming the tantalum oxide layer to a thickness between about 20 and 30 Angstroms.

7. The process described in claim 2 wherein the tantalum layer is deposited to a thickness between about 10 and 15 Angstroms.

8. The process described in claim 1 wherein the step of annealing further comprises heating in the presence a magnetic field of between about 6,000 and 10,000 Oe at a temperature between about 250 and 280° C. for between about 5 and 10 hours.

* * * * *